United States Patent [19]

Massen et al.

[11] 4,430,722

[45] Feb. 7, 1984

[54] METHOD AND ARRANGEMENT FOR THE CORRELATION OF TWO SIGNALS

[76] Inventors: Robert Massen, Kämpfenstrasse 39, 7760 Radolfzell 18; Jürgen Merkel, Neue Strasse 29C, 7867 Maulburg; Klaus-Peter Lindner, Gartenstrasse 6, 7881 Schwörstadt, all of Fed. Rep. of Germany

[21] Appl. No.: 191,351

[22] Filed: Sep. 26, 1980

[30] Foreign Application Priority Data

Oct. 3, 1979 [DE] Fed. Rep. of Germany ....... 2940158
Aug. 12, 1980 [DE] Fed. Rep. of Germany ....... 3030438

[51] Int. Cl.$^3$ ............................................. G06F 15/336
[52] U.S. Cl. ................................................... 364/728
[58] Field of Search ............................... 364/728, 819

[56] References Cited

U.S. PATENT DOCUMENTS

| | | | |
|---|---|---|---|
| 3,646,334 | 2/1972 | Wold | 364/728 |
| 3,648,040 | 3/1972 | Wold | 364/728 |
| 3,965,338 | 6/1976 | Van Gerwen et al. | 328/167 X |
| 4,019,038 | 4/1977 | Critten et al. | 364/728 |
| 4,097,801 | 6/1978 | Freeman et al. | 364/728 X |
| 4,244,026 | 1/1981 | Dickey, Jr. | 364/728 X |

FOREIGN PATENT DOCUMENTS

| | | |
|---|---|---|
| 1549603 | 5/1971 | Fed. Rep. of Germany . |
| 2124222 | 12/1972 | Fed. Rep. of Germany . |
| 2440530 | of 0000 | Fed. Rep. of Germany . |
| 2633565 | 2/1978 | Fed. Rep. of Germany . |
| 2206872 | of 0000 | France . |
| 40266 | of 1973 | United Kingdom . |

OTHER PUBLICATIONS

Diamantides "A Multipurpose Electronic Switch for Analog Computer Simulation & Autocorrelation Applications" *IRE Transactions on F¹⁻* Dec. 1956, pp. 197-202.
Jordan et al, "Correlation-Func Detection", *Electronics Letters*, vol. 8, No. 24, Nov. 30'72, pp. 602-04.
Pointon, "The Jodrell Bank 1024-Channel Digital Autocorrelation Spectrometer", *Journal of Physics & Scientific Instruments*, vol. 10, 1977, pp. 833-37.
Jordan, "A Correlation Interface Circuit For Microprocessor Systems" *Microelectronics Journal* vol. 10, No. 1, 1979, pp. 54-56.

*Primary Examiner*—David H. Malzahn
*Attorney, Agent, or Firm*—Gerald J. Ferguson, Jr.; Joseph J. Baker

[57] ABSTRACT

Disclosed is a method and apparatus for correlating first and second signals where sampling values of the signals are multiplied together and discrete values of the correlation function are determined. In one embodiment, the signals are sampled at different sampling frequencies such that one sampling frequency is a multiple of the other sampling frequency. A number of the respective last sampling values of the more fully sampled signal are stored and each sampling value of the more rapidly sampled signal is multiplied simultaneously by all of the stored sampling values of the more slowly sampled signal. The results of the multiplication are separately summed corresponding to equal time displacements between the multiplied sampling values. In a further preferred embodiment, a microcomputer is programmed for sampling the two signals with sampling frequencies having a ratio 1:k. The more slowly sampled signals are stored in an n stage register. The contents of corresponding register stages are multiplied in n multiplier circuits by the sampling values of the more quickly sampled signal. A summation store having m=k·n storage locations stores the multiplication values and a distributing circuit introduces the multiplication values into the storage locations associated with the respective time displacements for addition to the preceding storage location content.

32 Claims, 8 Drawing Figures

METHOD AND ARRANGEMENT FOR THE CORRELATION OF TWO SIGNALS

BACKGROUND AND SUMMARY OF THE INVENTION

The invention relates to a method for correlating two signals wherein mutually time-displaced sampling values of the two signals are multiplied together and to determine a discrete value of the correlation function the average value of the multiplication results corresponding to the same time displacement is formed, and an arrangement for carrying out this method.

The correlation of two different signals (cross correlation) and the correlation of a signal with the same but time-displaced signal (auto correlation) is used in many fields either to obtain information on certain properties of the signals or to obtain a prediction of the future behaviour of the signals. A known field of use of the correlation technique is the contactless velocity measurement of moving objects and fluids which is necessary in many branches of process technology and automation technology. Examples are the flow measurement in multi-phase flows or solids transport in conduits. In such cases, the fact utilized is that from the flowing media or moved surfaces with two optical, acoustic or capacitive sensors disposed with predetermined spacing from each other in the flow direction noise signals can be obtained from which the aid of the correlation analysis the time of travel of the flow of medium or the moved surface between the two sensors can be deduced. For the time displacement between the correlated signals corresponding to the maximum of the cross correlation function is equal to the time of travel from the first sensor to the second sensor.

To simplify the signal processing in the correlator it is known to conduct the correlation not with continuous analog signals but with discrete sampling values taken at predetermined intervals and preferably being brought into a digital form. A further known simplification is that as signal values only the signs of the sensor signals are evaluated in a so-called polarity correlator. In this case the sampling values are binary signals which assume only the one or the other of two signal values.

The hitherto known digital correlators are complicated laboratory measuring apparatuses on the basis of a fixedly wired computer which supply as result on an oscillograph screen or an XY recorder the entire variation of the correlation function from which the measuring engineer must determine manually the position of the maximum which is the sole value of interest in contactless velocity measurement. A further disadvantage is the long computing time; conventional correlators calculate the correlation function serially so that for example to compute from 256 discrete values and N takings of the mean per correlation discrete value the correlation lasts 256·N units of time.

Only then can the maximum be determined. To shorten the computing time more complicated laboratory correlators are known which have 256 parallel-operating multiplying and integrating stages and in each sampling time calculate a new estimate for the entire correlation function. In this case, a maximum can be localized very soon but the expenditure is extremely high. Both methods are not possible for production measuring equipment, the first because of the long measuring time and the second because of the technical expenditure involved.

So-called delay correlators are further known which with the aid of a controllable delay path, a control circuit and a voltage-controlled oscillator continuously determine with a mainly analog technique the delay from the zero passage of the differentiated correlation function by a gradient method. These correlators have the defects of all analog techniques, such as poor integrability to a large circuit and temperature and long time constancy problems. Moreover, the principle of determining the maximum with the aid of a control itself is very critical in the great number of cases of correlation functions occurring practically which exhibit not only a maximum but besides the main maximum numerous secondary maxima due to the periodic signal components (e.g. circulating pumps in a conduit section). It is then perfectly possible for the control circuit to lock on a secondary maximum and thus give a completely erroneous measurement. A further problem is the recognition of the stationary condition. In this case the correlation function has no significant maximum and a random searching of the controller must be prevented by auxiliary means. Because of the inherent inertia of the control circuit sudden restarting can also lead to the shifting maximum moving out of the detection range.

The aforementioned problems both in the laboratory correlator and in the delay correlator have meant that in spite of the undeniable fundamental advantages the correlative measuring technique has not been put into practice in industry.

The problem underlying the invention is to provide a method which enables the rapid and reliable correlation of two signals with low expenditure, and an arrangement for carrying out the method.

Proceeding from a method of the type set forth at the beginning this problem is solved according to the invention in that the one signal is sampled with a sampling frequency which is a multiple of the sampling frequency of the other signal, that a number of the respective last sampling values of the more slowly sampled signal is stored, that each sampling value of the more rapidly sampled signal is multiplied simultaneously by all the stored sampling values of the more slowly sampled signal and that the respective multiplication results corresponding to the equal time displacement between the multiplied values are separately summated.

The essential advantage of the method according to the invention is that the calculation of the correlation function is carried out in each sampling time of the more quickly sampled signal simultaneously on a plurality of discrete values so that after a relatively short number of sampling periods a calculation has been made for each discrete value of the correlation function. The recognition of the maximum forming during the averaging process can be made very early compared with a serial correlator.

The circuitry expenditure necessary for carrying out the method according to the invention is small. A preferred embodiment of an arrangement for carrying out the method contains according to the invention means for sampling the two signals in the frequency ratio 1:k, a register having n stages for storing the n last sampling values of the more slowly sampled signal, n multiplier circuits which each receive at an input the content of a register stage and at the other input in parallel the sampling values of the more quickly sampled signal, a memory having m=k·n storage locations and a distributing circuit for introducing the multiplication results furnished by the multiplier circuits into the memory locations associated with the respective time displacements with addition to the preceding content.

Such an arrangement can be constructed in simple manner with commercially available integrated analog or digital circuits. A particularly advantageous embodiment resides in that the distributing circuit and the memory are formed by a microcomputer.

An advantageous further development of the method according to the invention resides in that in each case in a first phase of each of a plurality of successive cycles the n multiplication results obtained simultaneously in each sampling period of the quicker sampling are introduced in time with the quick sampling in parallel into a buffer store, and in that in a second phase of each cycle the multiplication results stored in the buffer store are read from the buffer store in a manner clocked to the working rate of the summation store and distributed amongst the storage locations of the summation store.

In this further development of the invention the frequency of the quick scanning is determined independently of the working frequency of the summation store and only by the rate at which the multiplication results can be introduced into the buffer store. Even if it is assumed that the buffer store does not operate more rapidly than the summation memory, this means a multiplication of the sampling frequency by the factor n because in each case n multiplication results are introduced in parallel into the buffer store. Moreover, there is a further increase of the maximum possible sampling frequency because the groups of multiplication results can be introduced into the buffer store unsorted into consecutive storage locations and need not be added to the preceding content.

The calculation of the entire correlation function takes place in about the same time as with direct introduction of the multiplication results into the summation memory but on the basis of sampling values which are obtained with a very much higher sampling frequency. In particular when constructed as polarity correlator, in which the multiplication results are 1-bit numbers, with usual commercial microcomputer components sampling frequencies of about 50 kHz are readily obtained.

Advantageous embodiments and further developments of the method according to the invention and the arrangement for carrying out the method are characterized in the subsidiary claims.

BRIEF DESCRIPTION OF THE DRAWINGS

Further features and advantages of the invention will be apparent from the following description of an example of embodiment with the aid of the drawings, wherein.

DETAILED DESCRIPTION OF PREFERRED EMBODIMENTS

Figure 1:
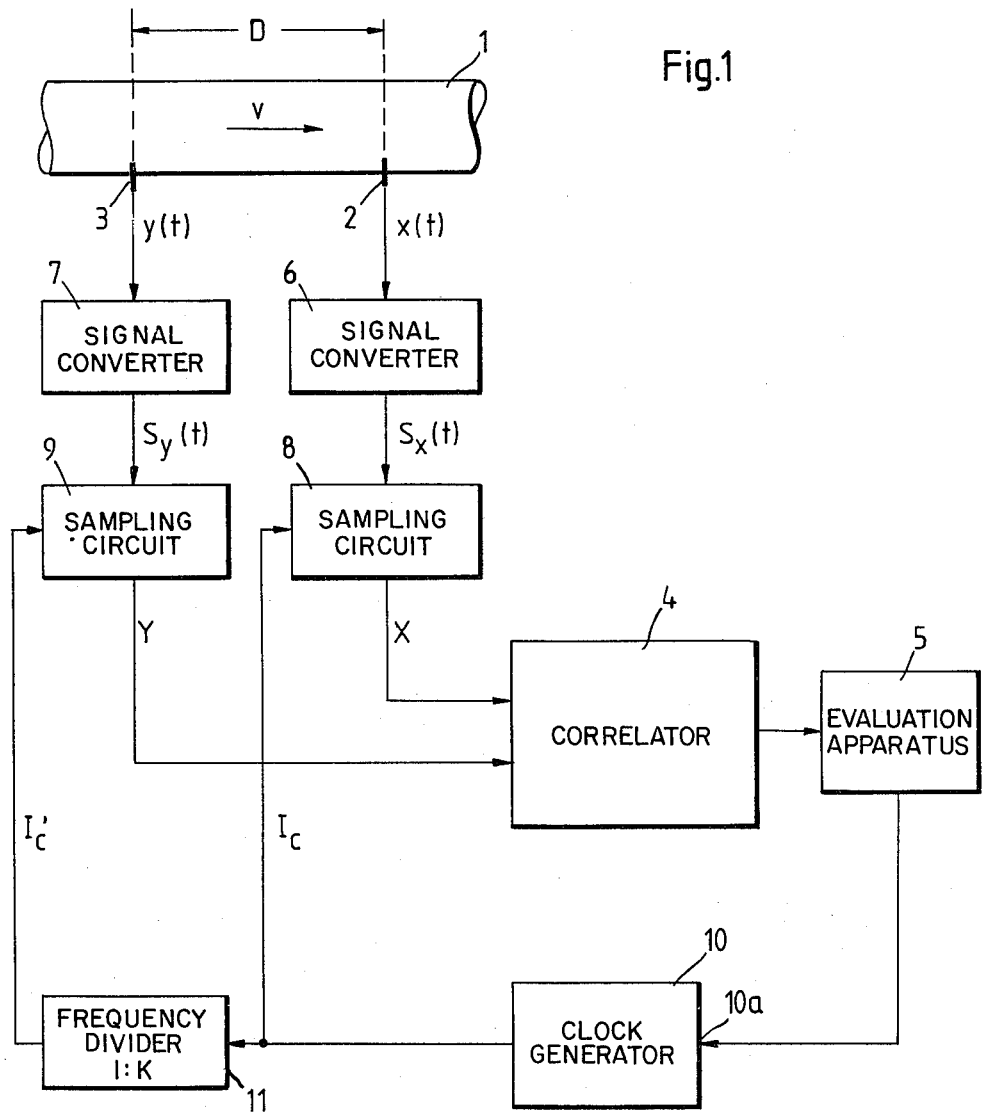
FIG. 1 is the scheme in an arrangement for the correlative measurement of the flow rate of a medium flowing in a conduit.

FIG. 1 shows as example of embodiment of a correlation system an arrangement for measuring the flow velocity v of a medium in a conduit 1. At the conduit 1 with an exact known spacing D two sensors 2 and 3 are disposed which derive from the flowing medium noise signals and furnish corresponding electrical signals x(t) and y(t) respectively. The sensors may be of any desired type, for example optical, acoustic or capacitive sensors.

It is known that by forming the cross correlation function $R_{xy}(\tau)$ between the two signals x(t) and y(t) the flow velocity in the conduit 1 can be determined. This is based on the fact that when the same flow components (eddies) pass the two sensors 2 and 3 the signals generated have certain similarities which produce a maximum in the cross correlation function. The cross correlation function has the mathematical formula $$R_{xy}(\tau) = \lim_{T\to\infty} \frac{1}{T} \int_o^T x(t)y(t+\tau)dt.$$

This means that the instantaneous values of the signal x(t) are multiplied by the instantaneous values y(t) displaced by a displacement time $\tau$ and the mean of the products is formed over the range of the observation time T. For each value of the displacement time $\tau$ a discrete value of the correlation function is obtained. In the use set forth here the correlation function has a maximum at a predetermined displacement time $\tau_M$ which is equal to the travel time of the medium from the sensor 3 to the sensor 2, i.e. when:

$\tau_M = D/V$

The correlation function is determined by a correlator 4. An evaluation apparatus 5 connected to the correlator investigates the correlationfunction for a maximum and furnishes the corresponding displacement time $\tau_M$ or the flow velocity v calculated therefrom.

In the example illustrated the correlator 4 does not calculate the correlation function directly from the analog signals x(t) and y(t) but for simplification by a method known per se from their signs; this is therefore a so-called polarity correlator. For this purpose a signal converter 6 is connected after the sensor 2 and furnishes at the output a binary signal $S_x(t)$ which assumes a signal value (for example the voltage zero) corresponding to the binary value 0 when the signal x(t) is negative and a signal value (for example a positive voltage value) corresponding to the binary value 1 when the signal x(t) is positive. For simplification, these signal values will be referred to hereinafter as "signal value 0" and "signal value 1". In corresponding manner connected after the sensor 3 is a signal converter 7 which furnishes at the output a binary signal $S_y(t)$ which corresponding to the sign of the signal y(t) assumes either the signal value 0 or the signal value 1. Each signal converter 6, 7 may, as known per se, be a threshold value generator which is formed for example by an operational amplifier without feedback and the threshold value of which is set to zero.

It is also possible to choose a threshold value other than zero; in this case at the output of each signal converter 6, 7 a binary signal is also obtained but this signal is not a sign signal.

Finally, in the arrangement illustrated use is made of the step known per se of conducting the correlation on a limited number of discrete sampling values of the signals to be correlated. To make this clear, in FIG. 1 two sampling circuits 8, 9 are illustrated which are inserted between the outputs of the signal converters 6, 7 and the correlator 4 and controlled by clock pulses furnished by a clock generator 10. The sampling circuits 8, 9 are so constructed that they each store on receipt of a clock pulse the signal value at the signal input and until the next clock pulse make it available at the output as sampling value X or Y. A special feature of the correlation arrangement described in more detail hereinafter is that the sampling of the two signals $S_x(t)$ and $S_y(t)$ is effected with different timing: whereas the clock pulses $I_c$ furnished by the clock generator 10 with the recurrent frequency $f_c$ are directly applied to the sampling circuit 8 the sampling circuit 9 receives these clock pulses via a frequency divider 11 with the division ratio 1:k so that the sampling circuit 9 is controlled by clock pulses $I_c'$ with the recurrence frequency $f_c'=f_c/k$. The sampling of the sign signals $S_y(t)$ and $S_x(t)$ is thus in the frequency ratio 1:k and in each case k sampling values X of the sign signal $S_x(t)$ are obtained for a sampling value Y of the sign signal $S_y(t)$.

Figure 2:
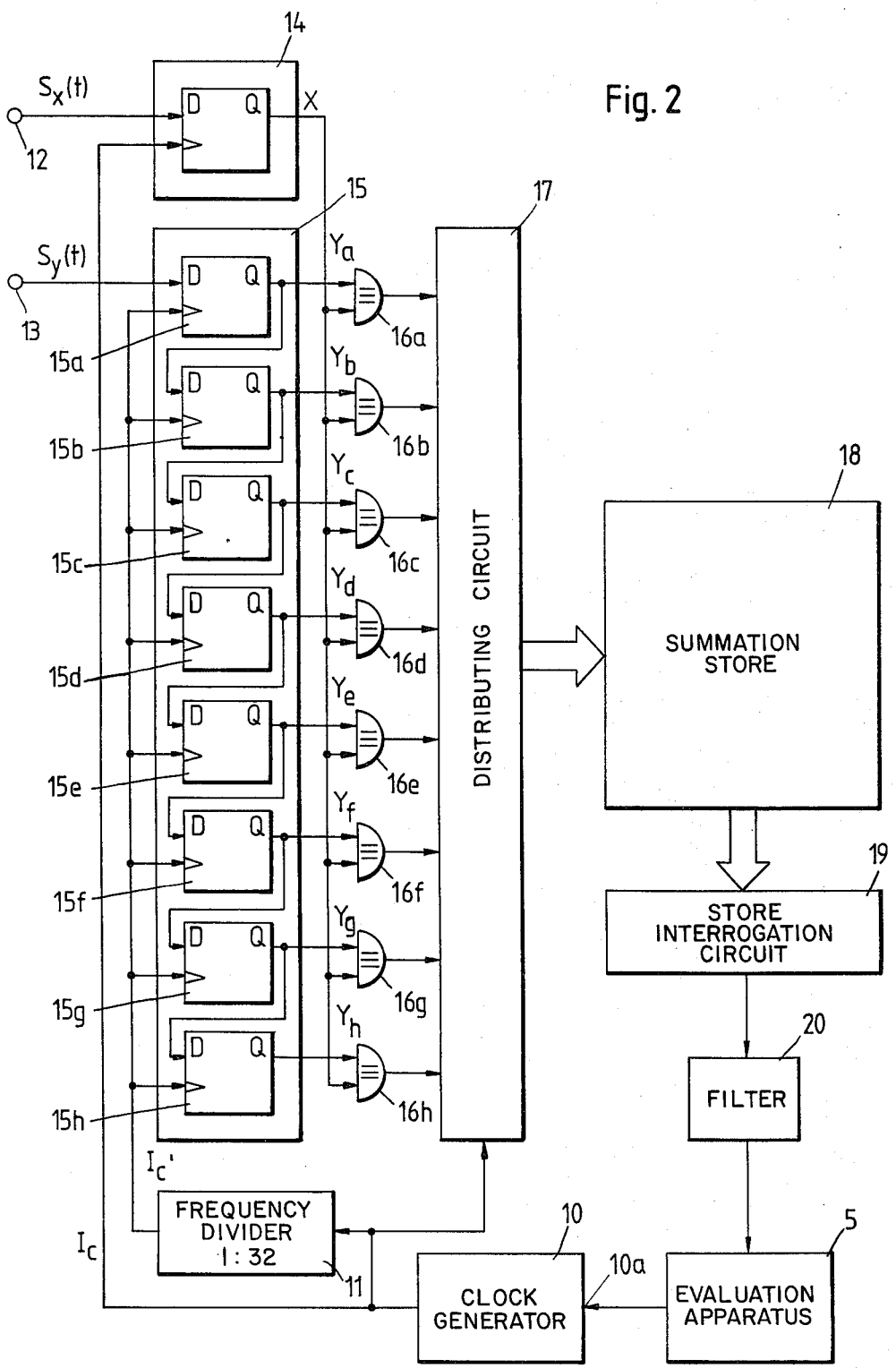
FIG. 2 is the block circuit diagram of the correlator of the arrangement of FIG. 1.

FIG. 2 shows an embodiment of the correlator 4 of FIG. 1. In this embodiment the sampling circuits are incorporated into the correlator; the correlator thus receives at two inputs 12, 13 the binary sign signals $S_x(t)$ and $S_y(t)$ which are furnished by the signal converters 6, 7.

The correlator includes a monostage X register 14 whose single register stage is formed by a D flip-flop whose D input is connected to the input 12 and to the clock input of which the clock pulses $I_c$ are applied by the clock generator 10. Corresponding to the known mode of operation of a D flip-flop the Q output assumes at the rising edge of each clock pulse $I_c$ the signal value at this instant at the D input and retains this value until the next clock $I_c$. It is thus immediately apparent that the X register 14 plays the part of the sampling circuit 8 of FIG. 1 and at the output makes available the sampling values X obtained by the successive samplings. This simple construction of the sampling circuit is possible because the sign signal $S_x(t)$ to be sampled is a binary signal.

Furthermore, the correlator includes a multi-stage Y register 15 with 8 register stages 15a to 15h which are also formed by D flip-flops. The Y register 15 is constructed as shift register in which in each case the Q output of each of the register stages 15a to 15g is connected to the D input of the following register stage 15b to 15h whilst the clock inputs of all the register stages 15a to 15h are connected in parallel to the output of the frequency divider 11. The D input of the first register stage 15a is connected to the input 13.

When a clock pulse $I_c'$ is applied to the clock input of the D flip-flop of the register stage 15a the Q output assumes the signal value of the sign signal $S_y(t)$ which is at the D input at this instant; this signal value remains as sampling value $Y_a$ at the output of the register stage 15a until appearance of the next clock pulse $I_c'$. It is thus apparent that the register stage 15a plays the part of the sampling circuit 9 of FIG. 1 for the sign signal $S_y(t)$.

The same clock pulse $I_c'$ which effects the sampling of the sign signal $S_y(t)$ in the register stage also initiates the transfer of the content of each of the register stages 15a to 15g into the next register stage 15b to 15h. Thus, in the time interval between two clock pulses $I_c'$ at the output of the register stage 15a the sampling value $Y_a$ obtained with the last clock pulse $I_c'$ is available; at the output of the register stage 15b a sampling value $Y_b$ is available which has been sampled with the preceding clock pulse $I_c'$ and, correspondingly, at the outputs of the register stages 15c to 15h sampling values $Y_c$ to $Y_h$ are available which each lie one period of the clock pulses $I_c'$ earlier than the sampling value in the preceding register stage. In other words, in the Y register 15 simultaneously the last eight sampling values of the sign signal $S_y(t)$ are stored and they are available in parallel at the outputs of the eight register stages.

As an example it is assumed that the frequency divider 11 has the division ratio 1:32 so that k=32. For each sampling value Y of the sign signal $S_y(t)$ 32 sampling values X of the sign signal $S_x(t)$ are thus obtained at the output of the X register 14.

Associated with the eight register stages 15a to 15h of the Y register 15 are eight multipliers 16a to 16h which are each connected at the first input to the Q output of the D flip-flop of the associated register stage 15a to 15h whilst the second inputs of all eight multipliers 16a to 16h are connected in parallel to the Q output of the D flip-flop of the X register 14. Since the signals to be multiplied are simple binary signals, each of the multipliers 16a to 16h is formed by a digital logic circuit. In the example each multiplier is an equivalence circuit, i.e. a digital logic circuit, which furnishes at the output the signal value 1 when its two input signals have the same signal value (0 or 1) whilst the output signal has the signal value 0 when the two input signals have different values. With regard to the formation of the sampling values X and Y at the inputs of each multiplier this means that as multiplication result the signal value 1 is obtained when the two sampled signals at the sampling instant were both positive or both negative whilst the signal value 0 is obtained as multiplication result if the sampled signals had opposite polarities at the sampling instant. This type of digital linking gives "stochastic" multiplication.

The outputs of the multipliers 16a to 16h are connected to the inputs of a distributing circuit 17 which in a manner explained hereinafter feeds the binary signals furnished as multiplication results by the multipliers into the storage locations of a summation store 18. The distributing circuit 17 may be synchronized for example for this purpose by the clock pulses $I_c$ of the clock generator 10.

The store 18 has m=k·n storage locations, where k is the already mentioned division factor of the frequency divider 11 and n the number of the last sampling values Y stored in the Y register 15. Thus, in this case:

$k=32; n=8; m=32\cdot8=256$ storage locations.

Each storage location of the store 18 has a capacity of several bits and the arrangement is such that the bits introduced successively into the same storage location can be added to the preceding content. As will be explained hereinafter, the content of each storage location represents a discrete value of the correlation function. A storage interrogation circuit 19 connected to the store 18 permits the interrogation of the storage locations and thus the recovery of the correlation function. The output of the store interrogation circuit 19 is connected to the evaluating apparatus 5 (FIG. 1).

The numerical values K, n and m in the example given above are powers of 2, where:

$$n=2^3=8; \quad m=2^n=256; \quad k=2^n/n=32.$$

The choice of these numerical values is expedient because commercially available integrated circuits can then be used for the various circuit components. The frequency divider 11 may be a 5-stage binary counter. The distributing circuit 17, the store 18 and the store interrogation circuit 19 are advantageously formed by a microcomputer with the word length of n bits which is programmed accordingly.

The Table I added at the end of the description shows the sampling values X and Y appearing during several successive sampling cycles in the X register 14 and Y register 15 respectively. At the heading of the Table the sampling times are given which correspond to the periods of the clock pulses $I_c$. These sampling times are denoted by $t_0, t_1, t_2 \ldots$, proceeding from any desired sampling time $t_0$ at which a pulse $I_c$ and a pulse $I_c'$ occur simultaneously. A sampling cycle corresponds in each case to a period of the slow clock pulses $I_c'$, i.e. 32 periods of the fast clock pulses $I_c$. To save space, only the first and last sampling times are indicated in each sampling cycle.

The sampling values X and Y are provided with an index which denotes the sampling time in which the sampling value was sampled. For each sampling time $t_0$, $t_1, t_2 \ldots$ in the X register 14 a sampling value $X_0, X_1, X_2$ ... appears which bears the same index as the sampling time.

Since in the sampling time $t_0$ a sampling of the signal $S_y(t)$ also occurs in this sampling time a sampling value $Y_0$ appears at the output of the stage 15a of the Y register 15. This sampling value remains unchanged until the sampling time $t_{31}$.

The sampling value previously in the stage 15a has been transferred at the start of the sampling time $t_0$ to the stage 15b. This sampling value was obtained 32 sampling times earlier and is denoted accordingly by $Y_{-32}$. The sampling value $Y_{-32}$ remains until the end of the sampling cycle at the output of the stage 15b.

In corresponding manner, during the entire sampling cycle at the outputs of the stages 15c to 15h there are the sampling values $Y_{-64}, Y_{-96}, Y_{-128}, Y_{-160}, Y_{-192}, Y_{-224}$, each obtained 32 sampling times earlier than the sampling value in the preceding stage.

The next sampling cycle starts with the sampling time $t_{32}$. At the start of this sampling time a clock pulse $I_c'$ again appears simultaneously with a clock pulse $I_c$ so that simultaneously with the sampling value $X_{32}$ in the X register 14 a new sampling value $Y_{32}$ appears in the stage 15a of the Y register 15. At the same time the previous contents of the stages of the Y register 15 are shifted by one stage so that the sampling value $Y_0$ is now in the stage 15b, the sampling value $Y_{-32}$ in the stage 15c, etc.

The same process is repeated at the start of each sampling cycle in the sampling times $t_{64}, t_{96} \ldots$, and the sampling values resulting therefrom, which are in the registers 14 and 15, are immediately apparent from the Table I.

In the course of each sampling cycle the 32 sampling values X appearing successively in the X register 14 are multiplied in the multipliers 16a to 16h simultaneously by the eight sampling values Y in the Y register 15. The Table II shows the displacement time $\tau$ between the respective sampling values multiplied together. It is assumed that the period of the clock pulses $I_c$ has the duration $\Delta\tau$ so that the displacement time is in multiples of $\Delta\tau$.

In the sampling time $t_0$ the sampling value $X_0$ has the following displacement time $\tau$ with respect to the sampling values $Y_a$ to $Y_h$ in the Y register:

With respect to the sampling value $Y_a$: 0 $\Delta\tau$;
with respect to the sampling value $Y_b$: 32 $\Delta\tau$;
with respect to the sampling value $Y_c$: 64 $\Delta\tau$;
with respect to the sampling value $Y_d$: 96 $\Delta\tau$;
with respect to the sampling value $Y_e$: 128 $\Delta\tau$;
with respect to the sampling value $Y_f$: 160 $\Delta\tau$;
with respect to the sampling value $Y_g$: 192 $\Delta\tau$;
with respect to the sampling value $Y_h$: 224 $\Delta\tau$.

Thus, in the sampling time $t_0$ at the output of the eight multipliers 16a to 16h simultaneously eight multiplication results are obtained which correspond to eight different displacement times $\tau$ each of 32 $\Delta\tau$ apart.

These multiplication results are fed by the distributor 17 into the storage locations of the store 18 associated with the respective displacement times. If the 256 storage locations are numbered no. 0 to no. 225, it is possible for each storage location to be associated with the displacement time whose factor agrees with the number of the storage location. Thus, in this case the output signal of the multiplier 16 will be fed into the storage location number 0, the output signal of the multiplier 16b into the storage location no. 32 and the output signals of the other multipliers 16c to 16h are fed into the storage locations no. 64, no. 96, no. 128, no. 160, no. 192, no. 224. As already mentioned, corresponding to the equivalence logic linking, each of these output signals may have either the signal value 0 or the signal value 1. If it is assumed that in the sampling time $t_0$ a new measuring cycle begins and the store 18 has been previously cleared, at the end of the sampling time $t_0$ the binary number 1 will thus be in some of the previously mentioned 8 storage locations whilst the remaining storage locations will be empty.

In the following sampling time $t_1$ the sampling values $Y_a$ to $Y_h$ are unchanged but the sampling value $X_1$ corresponds to a sampling $\Delta\tau$ later. Thus, between the stochastically multiplied sampling values there are now the displacement times 1 $\Delta\tau$, 33 $\Delta\tau$, 65 $\Delta\tau$, 97 $\Delta\tau$, 129 $\Delta\tau$, 161 $\Delta\tau$, 193 $\Delta\tau$, 225 $\Delta\tau$. The multiplication results are introduced by the distributor 17 into the storage locations no. 1, no. 33, no. 65, no. 97, no. 129, no. 161, no. 193 and no. 225.

In each of the successive third sampling times in corresponding manner simultaneously eight multiplication results are obtained for displacement times which are each $\Delta\tau$ greater than the displacement times corresponding to the preceding sampling time. These multiplication results are successively introduced into all storage locations of the store 18 until finally in the last sampling time $t_{31}$ of the respective sampling cycle eight multiplication results for displacement times of 31 $\Delta\tau$, 63 $\Delta\tau$, 95 $\Delta\tau$, 127 $\Delta\tau$, 159 $\Delta\tau$, 191 $\Delta\tau$, 223 $\Delta\tau$, 255 $\Delta\tau$, which are introduced into the last eight storage locations number 31, no. 63, no. 95, no. 127, no. 159, no. 191, no. 223 and no. 255 of the store 18. Thus, at the end of this sampling cycle a multiplication result having either the value 0 or the value 1 has been introduced into each storage location of the store 18.

In the next sampling time $t_{32}$, which is the first sampling time of the following sampling cycle, the same displacement times as in the first sampling time $t_0$ of the preceding sampling cycle obtain. The corresponding eight multiplication results are introduced into the eight storage locations no. 0, no. 32, no. 64, no. 96, no. 128, no. 160, no. 192, no. 224, in which there are already the multiplication results of the preceding sampling cycle. The new multiplication results are added to the content of the storage locations without the latter being cleared. The same operation is repeated for the following sampling times of this sampling cycle, the contents of the storage locations, depending on the multiplication result, remaining unchanged or being increased by one unit.

Since each storage location is associated with a predetermined time displacement between the sampling values multiplied together and in each storage location the products of sampling values which always correspond to the same time displacement are summed, the content of each storage location obviously corresponds to a discrete value of the correlation function.

Figure 3:
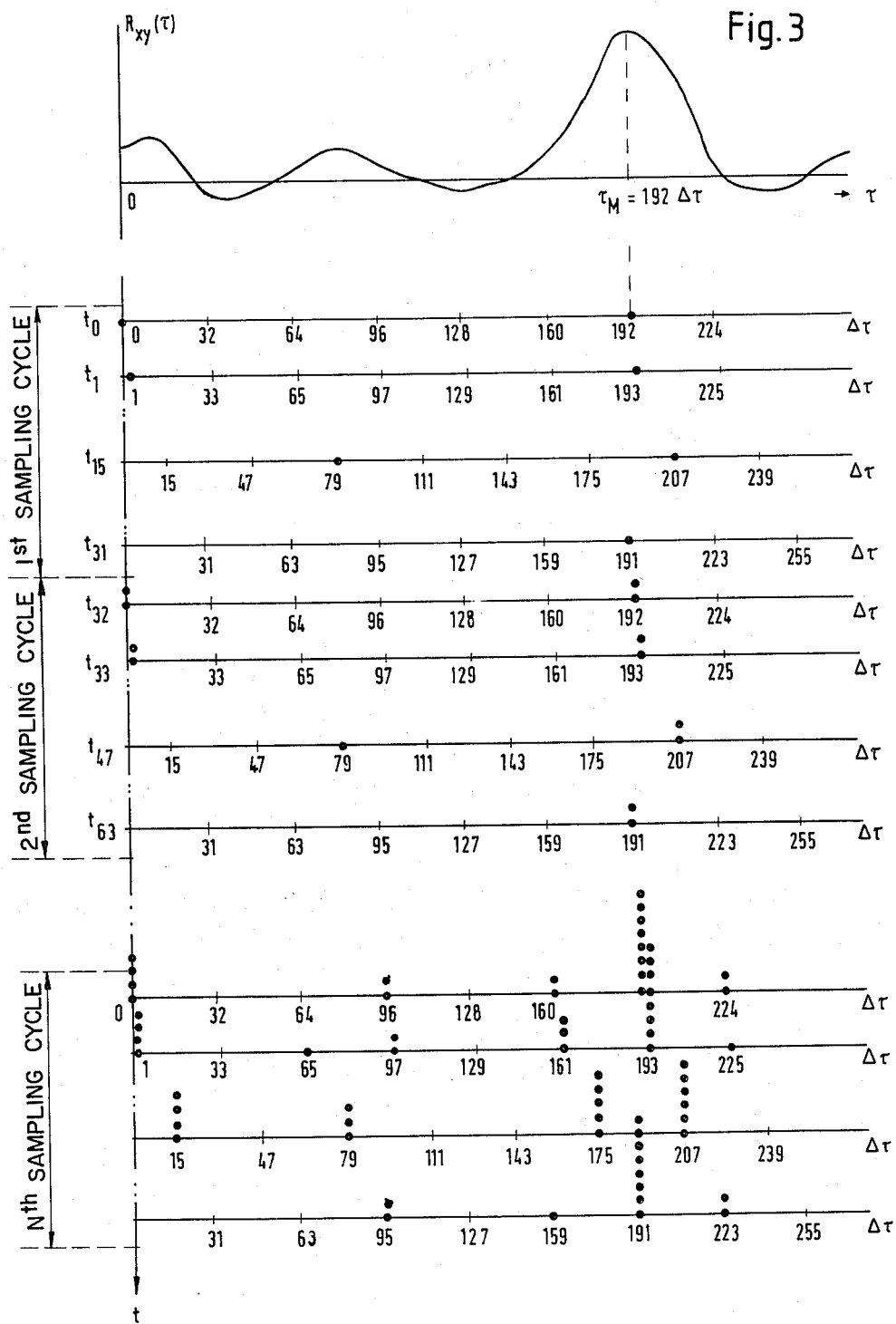
FIG. 3 is a diagram to illustrate the calculation of the correlation function with the correlator of FIG. 2.

FIG. 3 shows the gradual development of the discrete values of the correlation function in the store 18.

At the top of FIG. 3 a correlation function $R_{xy}(\tau)$ is plotted as a function of the displacement time $\tau$. The correlation function has a maximum at the displacement time $\tau_M = 192\Delta\tau$.

Illustrated beneath this diagram is the calculation of the discrete values in the successive sampling cycles, for simplicity only four sampling times being shown in each sampling cycle. The time axis is directed vertically downwards.

In the first sampling time $t_0$ of the first sampling cycle the simultaneous calculation of eight discrete values of the correlation function is carried out, these values lying at the abscissa points 0, 32, 64, 128, 160, 192 and 224 $\Delta\tau$. For the illustration each discrete value for which the multiplication result 1 was obtained and introduced into the corresponding storage cell is represented by a black dot.

In the next sampling time $t_1$ eight further discrete values of the correlation function are calculated which are offset in each case $\Delta\tau$ to the right with respect to the preceding discrete values and lie at 1, 33, 65, 97, 129, 161, 193, 225, $\Delta\tau$.

As example the calculation of the discrete values in the sampling time $t_{15}$ in the centre of the sampling cycle and in the last sampling time $t_{31}$ is illustrated.

At the end of the first sampling cycle, a calculation has thus been made on the basis of two sampling values for 256 discrete values of the correlation function each spaced $\Delta\tau$ apart.

In the second sampling cycle a second calculation is made for the same discrete values. When a multiplication result 1 is introduced into a storage location into which a result 1 has already been introduced in the preceding sampling cycle, a second dot is added to the already present black dot.

After N sampling cycles on the basis of the results already summated the maximum of the correlation function is apparent.

For evaluation of the correlation function in the store 18 the storage locations may be searched at predeterminable intervals with the aid of the store interrogation circuit 19 by the evaluating apparatus 5 for a miximum, and the correlation function consisting of discrete values may possibly be smoothed by interposition of a filter 20. If the circuit components 17, 18, 19 and 5 are formed by a microcomputer the filter 20 may be obtained by corresponding programming, (software filter). When an adequately significant correlation maximum has been recognized either the correlation time $\tau_M$ or the calculated velocity is issued. A new measuring cycle then starts, the store 18 either being cleared (summing operation) or the numerical values in the store divided by a constant amount, then proceeding from these numerical values (floating operation).

In the use considered of correlative velocity measurement the time displacement $\tau_M$ at which the maximum of the correlation function occurs corresponds to the travel time of the flow medium from the sensor 3 to the sensor 2. This travel time is obtained as a multiple of $\Delta\tau$ in a measuring range which goes from 0 to $m\cdot\Delta\tau$, i.e. in the example described from 0 to 255 $\Delta\tau$. By choice of the value of $\Delta\tau$ the measuring range can thus be fixed and varied as desired. Since $\Delta\tau$ is equal to the period of the clock generator 10, the measuring range may be fixed in very simple manner by corresponding setting of the frequency of the clock generator 10. The clock generator 10 is therefore preferably so constructed that its frequency is adjustable. The frequency adjustment may either be manually by an operator or automatically by a control signal which is applied for example by the evaluating apparatus 5 to a frequency control input 10a of the clock generator 10. Such an automatic frequency control is particularly advantageous when the evaluating means 5, together with the circuit components 17, 18, 19, 20, is formed by a microcomputer. In this case the clock pulses $I_c$ are preferably also furnished by the microcomputer so that the clock generator 10 is also part of the microcomputer. By suitably programming the microcomputer it is then possible to adapt the measuring range to the velocity range investigated in order to place the maximum of the correlation function in a favourable range and make optimum use of the resolving power of the correlator. For example, after an initial approximate determination of the position of the correlation maximum the correlation function can be spread by increasing the frequency of the clock generator 10 so that only the region containing the maximum is then investigated.

Figure 4:
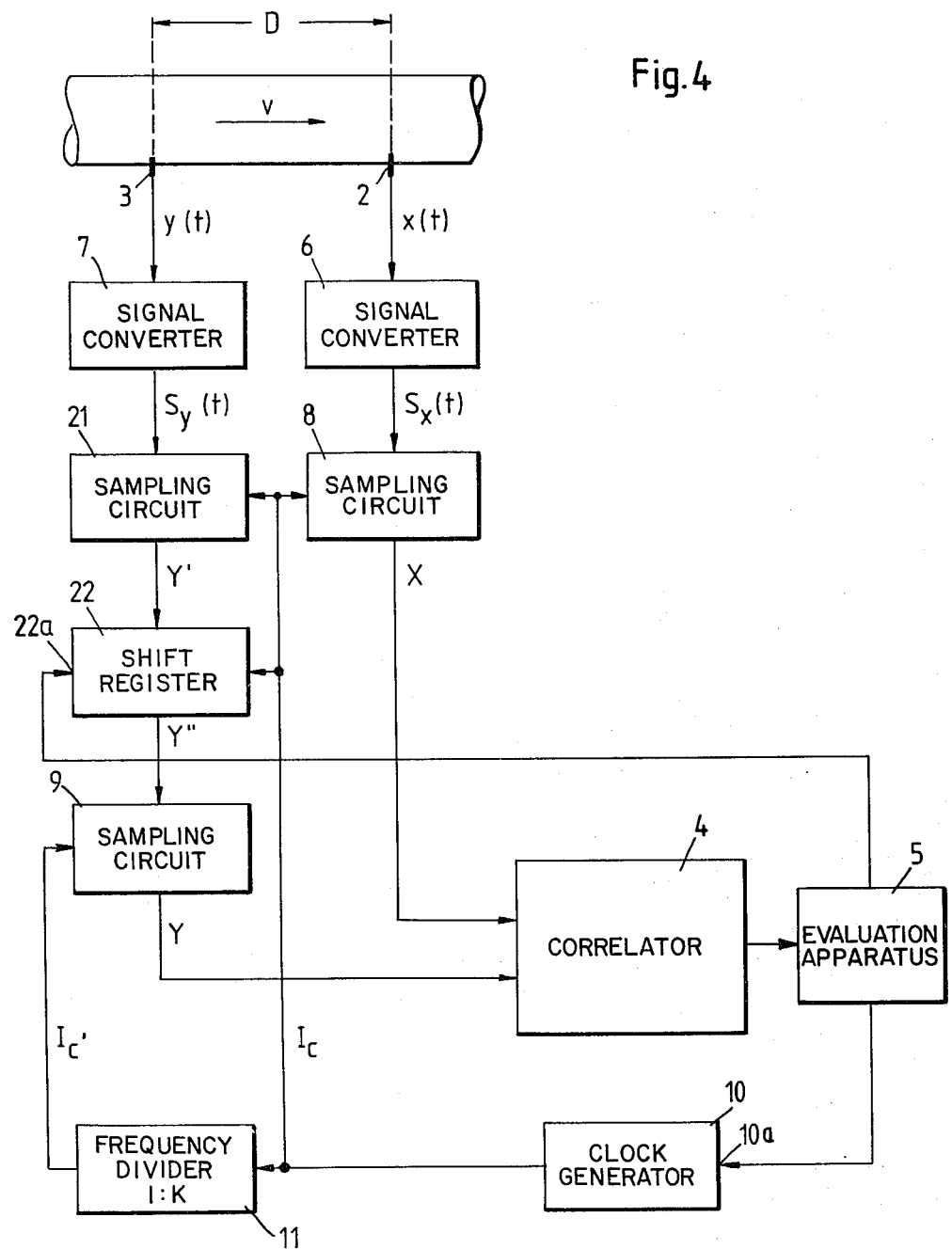
FIG. 4 is a modified embodiment of the arrangement of FIG. 1.

This possibility of selecting the investigated region of the correlation function may be further increased by imparting to the more slowly sampled signal prior to introduction into the register an additional predelay which is preferably adjustable. FIG. 4 shows as example a further development of the arrangement of FIG. 1 with which this predelay can be obtained for the case considered here where the correlated signals are sampling values of binary signals. For this purpose, the signal converter 7 is followed by a sampling circuit 21 which is clocked by the fast clock pulses $I_c$ and between the sampling circuit 21 and the sampling circuit 9 a shift register 22 is inserted which is also clocked by the fast clock pulses $I_c$. At the output of the sampling circuit 21 sampling values Y' appear synchronously with the sampling values X and with the same fast recurrence frequency as the latter. The sampling values Y" appearing at the output of the shift register 22 are however delayed with respect to the sampling values Y' and X by a time $q\cdot\Delta\tau$, where q is the number of stages of the shift register 22. With the slow recurrence frequency of the pulses $I_c'$ the sampling circuit 9 then derives from these delayed sampling values Y' the sampling values Y which are stored in the Y register 15 (FIG. 2) and multiplied by the sampling values X.

Since in the example of embodiment of FIG. 2 the Y register plays the part of the sampling circuit 9 the output of the shift register 22 is connected to the terminal 13 when the further development illustrated in FIG. 4 is used. Otherwise, the circuit of FIG. 2 remains unchanged.

The predelay imparted by the shift register 22 has the effect that between the sampling values X appearing in the X register 14 and the sampling values $y_a$ to $y_h$ in the y register 15 displacement times are present which are in each case $q \cdot \Delta\tau$ greater than the displacement times which were previously explained for the example of embodiment of FIGS. 1 and 2 and are shown in Table II. The measuring range is thus no longer from 0 $\Delta\tau$ to 255 $\Delta\tau$ but from $q \cdot \Delta\tau$ to $(255-q)\Delta\tau$.

It is thus initially possible to suppress an initial region of the correlation function going from 0 to $q \cdot \Delta\tau$ if no correlation maximum is to be expected in this initial range.

It is particularly advantageous for the predelay imparted to the more slowly sampled signals to be adjustable which can be achieved in the example of embodiment of FIG. 4 by using a shift register 22 in which the number q of the stages coming into effect is varied by a control signal applied to the control input 22a. In conjunction with the previously mentioned adjustment of the frequency of the clock generator 10 it is then possible to select an interesting portion of the correlating function and expand this portion over the entire measuring range.

This adjustment of the predelay can again either be by an operator manually or automatically by a control signal which is applied by the evaluating means 5 to the control input 22a as illustrated in FIG. 4. If the correlator 4 and the evaluating means 5 are formed by a microcomputer, the latter can for example, after the initial establishment of a correlation maximum going beyond a predetermined minimum value, adjust the predelay so that the maximum is shifted into the centre of the measuring range and then change the frequency of the clock generator 10 so that the portion containing the maximum is spread over the entire measuring range.

The predelay of the more slowly sampled signal may of course also be obtained in a different manner. It may also be imparted directly to the analog signal y(t), for example with the aid of a delay line.

The principle described above of the parallel calculation of discrete values on the basis of sampling values of a more rapidly sampled signal and several stored sampling values of a more slowly sampled signal is not restricted to the case involving binary sampling values of a sign signal. It is readily possible to use the same principle when the sampling values express the amount and sign of the sampled signal value. In the arrangement of FIG. 1 this means that the signal converters 6 and 7 are omitted so that the sampling circuits 8 and 9 sample the signals x(t) and y(t) respectively directly. Furthermore, the sampling circuits 8 and 9 are so constructed that they furnish output signals which apart from the sign also reproduce the amplitude of the sampled signals, preferably in binary coded form. If the sampling circuits are formed as analog circuits, for example in the form of the known sample and hold circuits, each sampling circuit is followed by an analog-digital converter which converts the analog sampling value to a multi-digit binary number representing amount and sign.

Each stage of the registers 14 and 15 in FIG. 2 is then so designed that it can store a multi-digit binary number by presenting the respective sampling value. Similarly, multipliers 16a to 16h are used which are able to multiply multi-digit binary numbers. Such a multi-digit design of the circuit described presents the person skilled in the art with no difficulty. It is also possible to conduct the correlation method described with analog sampling values instead of binary or digitally coded sampling values. In this case, apart from the sampling circuits the Y register and the multipliers are also made in the analog technique; for example, the Y register can be formed by an analog shift register in the manner of charge-coupled arrangements (bucket-chain circuits). Since for the storing and summation of the multiplication results in this case as well a digital memory is preferably used, between the outputs of the analog multipliers and the inputs of the distributing circuit analog-digital converters are inserted which in cases where sign signals are processed are again simple threshold value generators and in cases with multi-digit processing are quantizing and coding circuits.

Figure 8:
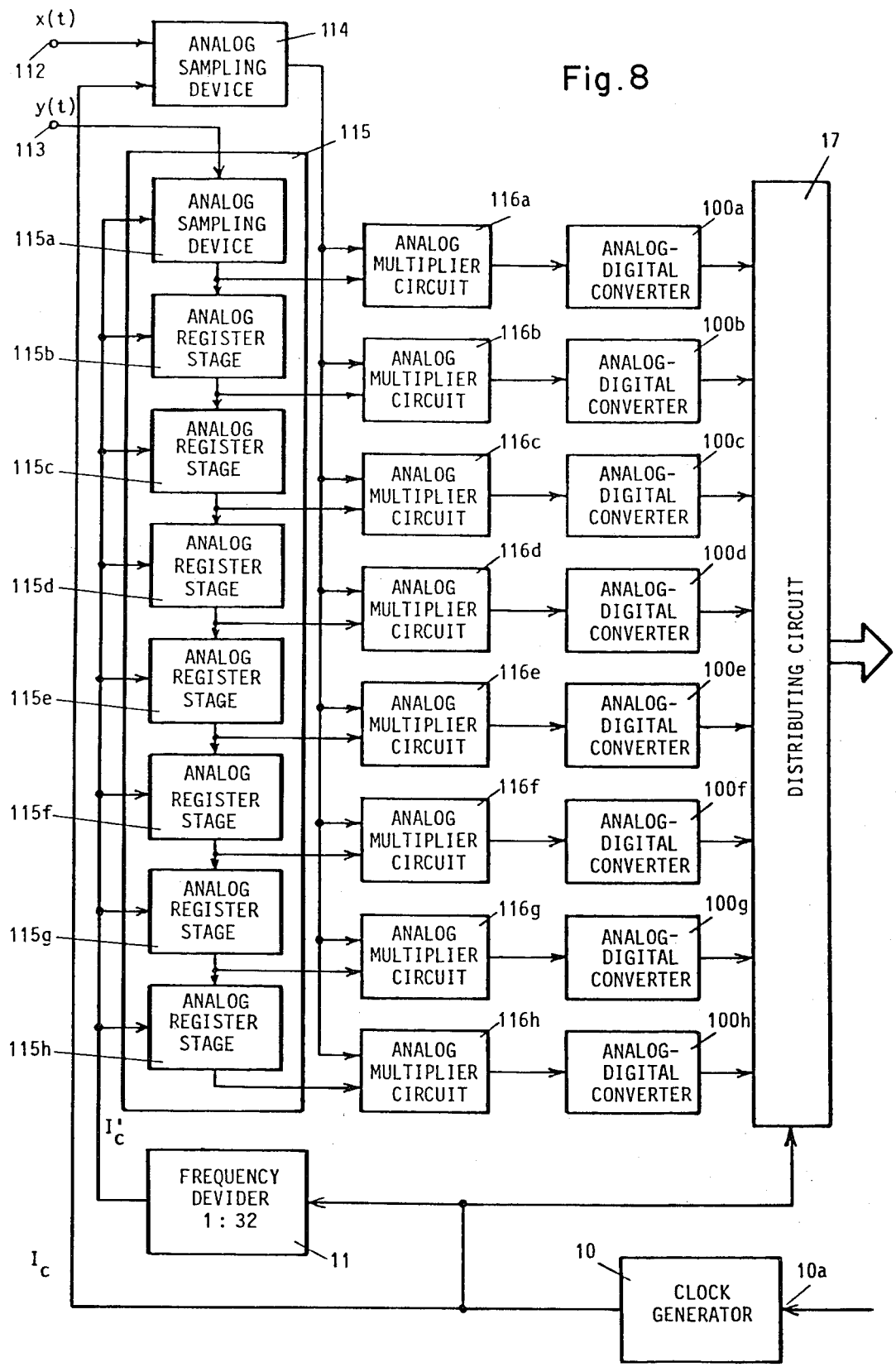
FIG. 8 is a block circuit diagram of an analog embodiment of the invention.

An example of the before-mentioned analog embodiment of the correlator of FIG. 2 is shown in FIG. 8. The clock generator 10, the frequency divider 11 and the distributing circuit 17 are identical with the corresponding circuits in FIG. 2 and therefore designated by the same reference numbers. The circuits following the distributing circuit 17 are not shown in FIG. 8, as they remain unchanged with respect to FIG. 2. Only the circuits connected ahead of the distributing circuit 17 are changed from the digital to the analog technique. For easier reference, the circuits of FIG. 8 bear reference numbers which are increased by 100 over the reference numbers of the circuits of FIG. 2 which perform comparable functions.

The inputs 112, 113 receive the analog signals x(t) and y(t), respectively. These analog signals are supplied to the input terminals of two analog sampling devices 114 and 115a, respectively. The analog sampling device 114, which may be a well-known "sample & hold" device, is actuated by the fast clock pulses $I_c$ so that it samples the instantaneous value of the analog signal x(t) existing at the time of each clock pulse $I_c$ and furnishes an output signal representing the last analog sampling value.

The analog sampling device 115a is controlled by the slow clock pulses $I_c'$ so that it samples the analog signal y(t) in a similar manner. Connected to the output of the analog sampling device 115a is a chain of analog register stages 115b to 115h which are also controlled by the clock pulses $I_c'$ whereby an analog shift register 115 is formed. Each clock pulse $I_c'$ causes the sampling of the analog signal y(t) by the analog sampling device 115a, the transfer of the previous sampling value from the analog sampling device 115a to the analog register stage 115b, and the transfer of the content of each analog register stage 115b to 115g to the next analog register stage. Preferably, the analog shift register 115 is a well-known charge-coupled device (bucket-chain circuit) having the desired number of stages. It is generally known that the first stage of such an analog shift register acts as an analog sampling device which at each clock pulse samples the instantaneous value of the analog signal fed to the input of the shift register.

The output of each stage of the analog shift register 115 is connected to the first input of an associated analog multiplier circuit 116a to 116h. The second inputs of the analog multiplier circuits are connected to the output of the analog sampling device 114. Each analog multiplier circuit furnishes an output signal representing the multiplication result.

The output of each analog multiplier circuit 116a to 116b is connected to the input of an associated analog-digital converter 100a to 100h. The outputs of the analog-digital converters are connected to the corresponding inputs of the distributing circuit 17. In the correlator of FIG. 2 the maximum frequency of the fast sampling is limited by the operating speed of the summation store or memory 18. For the frequency $f_c$ of the fast sampling must be so dimensioned that the n multiplication results occurring in each sampling period can be introduced into the associated storage locations of the summation store 18 and added to the preceding content. If the correlator contains a microcomputer as distributing circuit 17 the maximum sampling frequencies which can be achieved are only about 1000 Hz. This restricts the method to relatively low-frequency signals so that for many uses the resolution of the correlation maximum and thus the measuring accuracy cannot meet the requirements.

Figure 5:
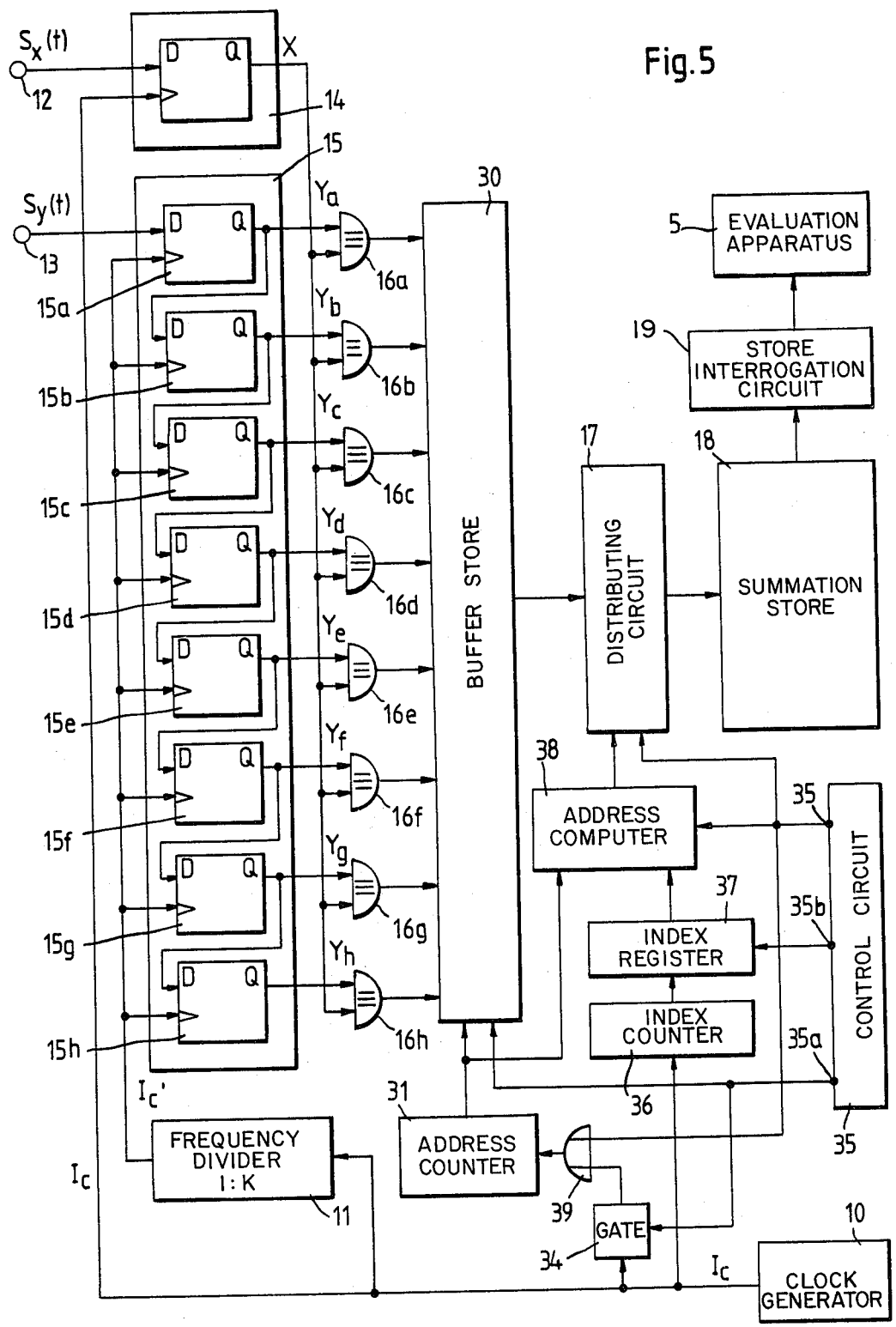
FIG. 5 is a block circuit diagram of a modified embodiment of the correlator of FIG. 2.
Figure 6:
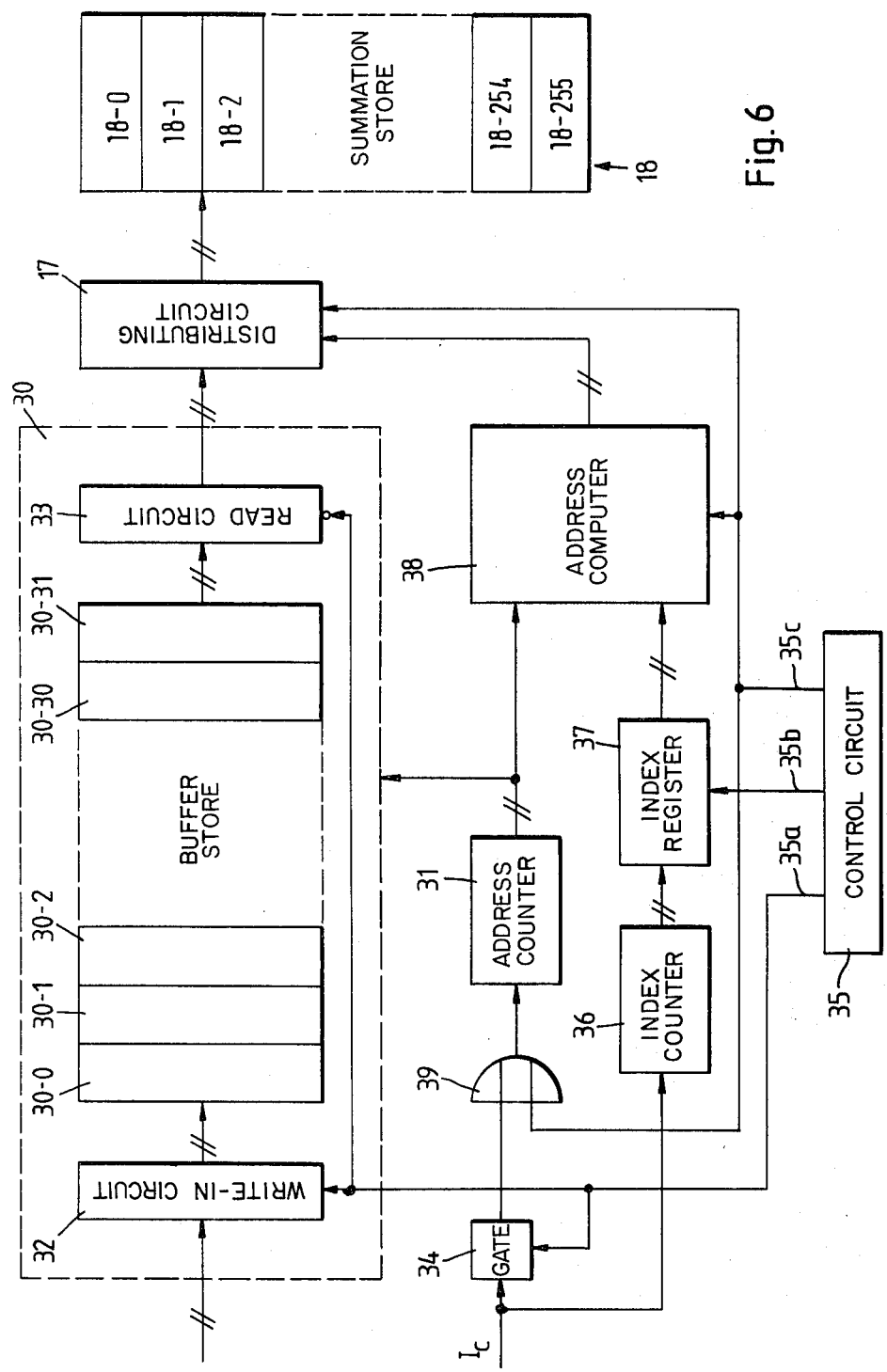
FIG. 6 is a detailed circuit diagram of part of the correlator of FIG. 5.
Figure 7:
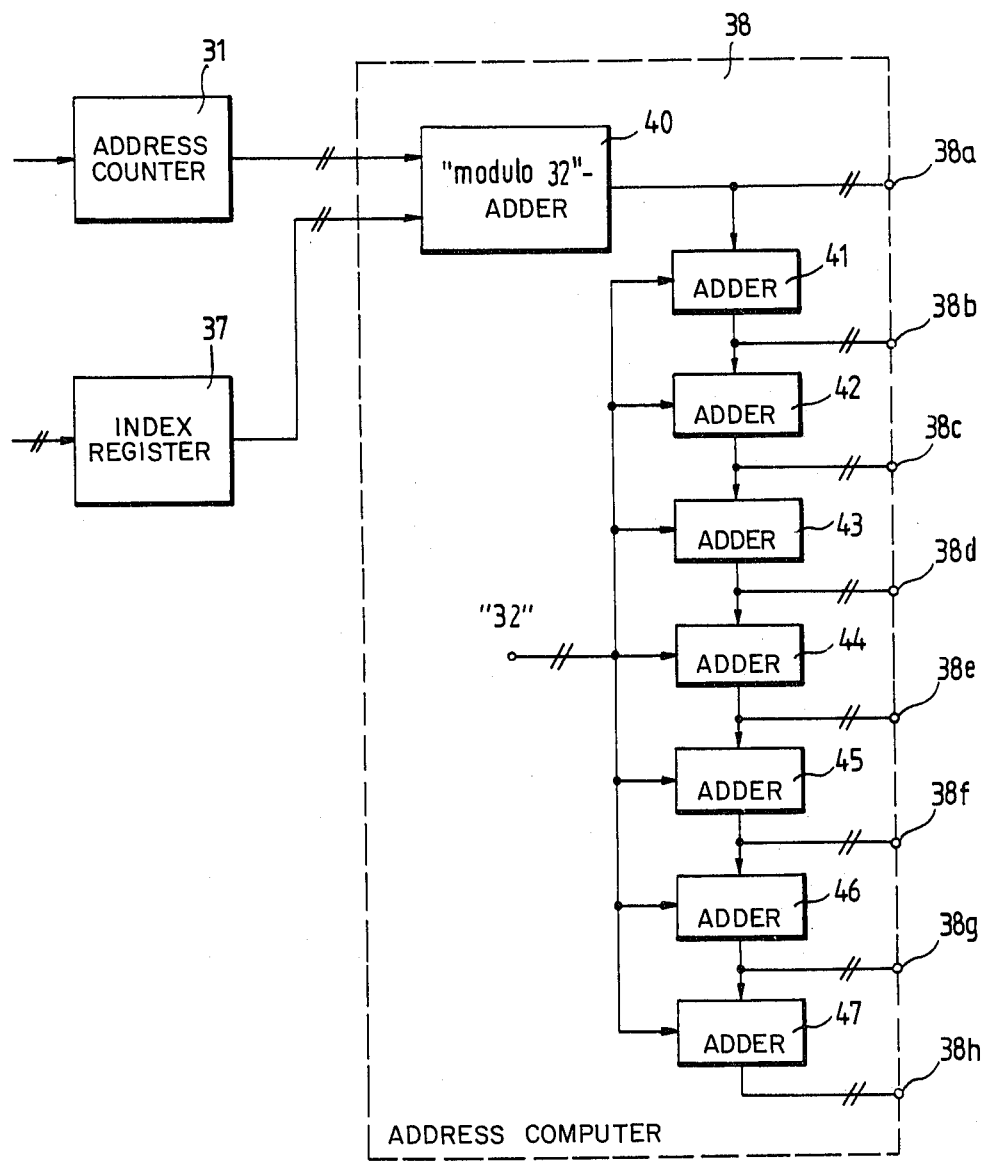
FIG. 7 is an example of embodiment of the address computer of the correlator of FIG. 5.

FIGS. 5 to 7 show a modified embodiment of the correlator which permits the calculation of the correlation function substantially in the same time as with the embodiment of FIG. 2 but on the basis of sampling values obtained with a very much higher sampling frequency. In FIG. 5 the components of the correlator having the same functions as the corresponding components of FIG. 2 are designated with the same reference numerals. These components will not be described again.

In contrast to FIG. 2, in FIG. 5 the outputs of the multipliers 16a to 16h are connected to the data inputs of a buffer store 30 with which address counter 31 is associated. The buffer store 30, illustrated in detail in FIG. 6, includes a write-in circuit 32, a read circuit 33 and in the example illustrated k=32 storage locations 30-0, 30-1, . . . 30-31, whose addresses are designated by 0, 1, . . . 31. Each storage location has a capacity sufficient to accommodate the multiplication results furnished simultaneously by the multipliers 16a to 16h. Since in the example described of a polarity correlator each multiplication result is represented by a bit, each storage location of the buffer store 30 thus requires a capacity of 8 bits. The address counter 31 is constructed as "modular 32" counter.

The address counter 31 has a clock input which is connected to the output of an OR circuit 39. The one input of the OR circuit 39 is connected to the output of a gate circuit 34 whose signal input receives the fast clock signals $I_c$ from the clock generator 10. The control input of the gate circuit 34 is connected to an output 35a of a control circuit 35 which is also connected to a release input of the write-in circuit 32 and a blocking input of the read circuit 33.

An index counter 36 receives the clock pulses $I_c$ and thus counts said pulses. The index counter 36 is constructed as "modulo k" counter, i.e. in the present case as "modulo 32" counter, which after every counting of 32 clock pulses $I_c$ is reset to the zero condition. It operates synchronously with the frequency divider 11 so that it passes from the count 31 to the count zero whenever the frequency divider 11 furnishes a pulse $I_c'$ at the output. The index counter can also be formed by the frequency divider 11 if the latter, as is usual, is a five-stage binary counter. The count of the index counter shows within each slow sampling period of the pulses $I_c'$ the number of each fast sampling period of the pulses $I_c$. The stage outputs of the index counter 36 are connected to the inputs of an index register 37 which has a trigger input which is connected to a further output 35b of the control circuit 35. When the control circuit 35 applies a short pulse to the trigger input of the index register 37 the instantaneous count of the index counter 36 is transferred to the index register 37.

The stage outputs of the index register 37 are connected to corresponding inputs of an address computer 38 which receives at a second input group thge output signals of the address counter 31 representing the address.

The outputs of the read circuit 33 of the buffer store 30 are connected to the distributing circuit 17 which introduces the signals read from the buffer store 30 into the storage locations of the summation store 18 defined by the addresses furnished by the addressing computer 38.

The transfer of the stored data from the buffer store 30 is controlled by clock signals which are furnished by an output 35c of the control circuit 35. The output 35c is connected to the second input of the OR circuit 39, a clock input of the address computer 38 and a clock input of the distributing circuit 17.

The summation store 18 again has m=k·n storage locations, i.e. 256 storage locations in the example described. The store interrogation circuit 19 connected to the stor 18 permits the interrogation of the storage locations and thus recovery of the correlation factor. The output of the store interrogation circuit 19 is connected to the evaluating means 5.

The introduction of the multiplication results into the buffer store 30 and the transfer of the content of the buffer store 30 into the summation store 18 is controlled by the control circuit 35. This operation is cyclic, each cycle consisting of two phases. In phase I the groups of in each case n=8 multiplication results, appearing simultaneously at the outputs of the multipliers 16a to 16h, are introduced into the buffer store 30 with the timing of their appearance, i.e. in time with the fast sampling frequency $f_c$. When the buffer store 30 is full the phase II begins in which the multiplication results in the buffer store 30 are allocated via the distributing circuit 17 to the summation store 18 and added to the preceding content of the respective storage locations. This transfer is with a clock frequency determined by the control circuit 35 in accordance with the operating speed of the summation store 18 and the associated circuits. This clock frequency may be considerably less than the clock frequency defined by the fast sampling frequency $f_c$.

At the start of phase I of each cycle the control circuit 35 furnishes at the output 35b a short pulse which efffects the transfer of the instantaneous count of the index counter 37 to the index register 38. In this manner the number of the fast sampling period designating the start of phase I is fixed. This step makes it possible to start the cycle at any instant within a slow sampling period.

Simultaneously with the emission of the short pulse at the output 35b the control circuit 35 emits at the output 35a a signal which remains for the entire duration or phase I. This signal opens the gate circuit 34, releases the write-in circuit 32 of the buffer store 30 and blocks the read circuit 33.

The address counter 31 has been returned at the end of the preceding cycle to zero. Therefore, on opening the write-in circuit 32 the first group of n=8 multiplication results belonging to the fast sampling period in the index register 37 are fed in parallel into the storage location 30-0 of the buffer store 30 which is identified by the address 0 in the address counter 31.

Due to the opening of the gate circuit 34 the address counter 31 is advanced by the fast sampling pulses $I_c$. Thus, in the next fast sampling period the address 1 is therefore in the address counter 31 and the group of n=8 multiplication results belonging to this fast sampling period is introduced into the storage location 30-1 of the buffer store 30.

In this manner the groups of n=8 multiplication results appearing at the outputs 16a to 16h are introduced in parallel into the consecutive storage locations of the buffer store 30 until all k=32 storage locations are full. In the buffer store 30 there are n·k=m=256 multiplication results which represent the discrete values of the correlation function, one discrete value for each discrete point. These 256 discrete values have been obtained in 32 successive sampling periods of the fast sampling. The fast sampling frequency $f_c$ is thus only restricted by the frequency with which the bit groups can be introduced into consecutive storage locations of the buffer store 30.

Phase I ends when the buffer store 30 is full, i.e. when the address counter 31 passes from the count 31 to the count 0. The signal furnished at the output 35a of the control circuit 35 then assumes a value which blocks the gate circuit 35 and the write-in circuit 32 and releases the read circuit 33.

In the following phase II the sampling circuits 14, 15 and the multipliers 16a to 16h continue to operate in the previously described manner controlled by the clock pulses $I_c$ and $I_c'$; however, the multiplication results furnished by the multipliers 16a to 16h are ignored due to the blocking of the write-in circuit 32.

The index counter 36 is however further advanced by the fast clock pulses $I_c$ so that its count indicates at any instant the number of the fast period within the slow period then running.

If for example phase I began in the fast sampling period no. 29, the following displacement times apply for the eight discrete values of this sampling period:

Multiplier 16a: $(29+0\cdot32) \Delta\tau = 29 \Delta\tau$
multiplier 16b: $(29+1\cdot32) \Delta\tau = 61 \Delta\tau$
multiplier 16c: $(29+2\cdot32) \Delta\tau = 93 \Delta\tau$
multiplier 16d: $(29+3\cdot32) \Delta\tau = 125 \Delta\tau$
multiplier 16e: $(29+4\cdot32) \Delta\tau = 157 \Delta\tau$
multiplier 16f: $(29+5\cdot32) \Delta\tau = 189 \Delta\tau$
multiplier 16g: $(29+6\cdot32) \Delta\tau = 221 \Delta\tau$
multiplier 16h: $(29+7\cdot32) \Delta\tau = 253 \Delta\tau$ These discrete values must therefore be introduced into the storage locations 18-29, 18-61, 18-93, 18-125, 18-157, 18-189, 18-221, 18-253 of the summation store 18 and added to the preceding content.

The addresses of these storage locations are calculated by the address computer 38 and given to the distributor 17.

An example of embodiment of the address computer 38 is shown in FIG. 7. It includes a "modulo 32" adder 40 which receives at two input groups the output signals of the address counter 31 and of the index register 37. The output of the "modulo 32" adder 40, which furnishes the "modulo 32" sum of the input signals, represents directly the first output 38a of the address computer 38. This output furnishes the store address at which the first discrete value of the group of eight discrete values taken from the buffer store 30 is to be disposed in the summation store 18.

Furthermore, at the output of the "modulo 32" adder 40 seven adder circuits 41, 42, 43, 44, 45, 46, 47 are connected in cascade. The second inputs of these adder circuits continuously receive a signal representing the number "32". The outputs of these adder circuits form the outputs 38b, 38c, . . . 38h of the address computer.

Thus, at the output 38b an address appears which is 32 greater than the address at the output 38a. In corresponding manner, the address at each further output 38c, 38d, . . . of the address computer 38 is 32 greater than the address at the preceding output. It is immediately apparent that the addresses previously explained to which the eight discrete values are to be allocated are obtained in this manner.

The distributor 17 allocates the eight discrete values of each discrete value group consecutively to the addresses in the summation store 18 indicated by the address computer 38. Only when this operation has been completed does the control circuit 35 furnish the next clock pulse at the output 35c.

This clock pulse brings the content of the address counter 31 to 1. The read circuit 33 thus reads out the content of the storage location 30-1. On the basis of the new count of the address counter 31 the address compute 38 calculates the new addresses, i.e. in the above example the addresses 30, 62, 94, 126, 158, 190, 222, 254. The distributor 17 allocates the eight discrete values extracted to the corresponding storage locations of the summation store 18.

When the address counter 31 reaches the count 3 the address computer does not furnish at the output 38a the address 32 but, since the adder circuit 40 is constructed as "modulo 32" adder, the address O. Consequently, at the other outputs 38b, 38c, . . . 38h the addresses 32, 64, 96, 128, 160, 192, 224 appear. These addresses are associated with the displacement times 0 $\Delta\tau$, 32 $\Delta\tau$, . . . 224 $\Delta\tau$, which is correct because the discrete value group extracted from the storage location 30-3 of the buffer store 30 belongs to the fast sampling cycle no. 0 of the next slow sampling cycle.

In this manner, in phase II all 256 discrete values are extracted consecutively from the buffer store 30 and introduced into the summation store 18.

Phase II is completed when the last discrete value group has been extracted from the storage location 30-31 and introduced into the store 18. The address counter 31 then goes to zero and the control circuit 35 can initiate the phase I of the next cycle in the manner described above in which once again 256 discrete values are obtained in the clock frequency of the fast sampling, stored in the buffer store 30 and then introduced into the summation store 18.

The mode of operation described permits a substantially higher fast sampling frequency $f_c$ than in the case of direct introduction of the multiplication results into the summation store 18 as used in the correlator of FIG. 2. In the latter, the fast sampling frequency can only be as large as the recurrence frequency of the clock pulses at the output 35c of the control circuit 35 in the present case. This recurrence frequency must be so dimensioned that in each clock period consecutively eight bits of information can be introduced into various storage locations of the summation store 8 and added to the preceding content.

In the embodiment of the correlator described here, with the same operating speed of the summation store 18 the fast sampling frequency can be at least n times (i.e. in this case eight times) greater because in each fast clock period eight discrete values are introduced in parallel into the buffer store 30.

A further increase is however generally obtained because the direct introduction of information into a store can be carried out more rapidly than the addition to the preceding content of the store and the introduction into the buffer store takes place without order into consecutive storage locations.

The use of the index counter 36 and the index register 37 gives the advantage that phase I of each cycle may be initiated at any desired instant so that after termination of phase II of the preceding cycle no waiting time elapses. However, in a simplified embodiment the index counter 36 and the index register 37 may be omitted; a condition for this is that the control circuit 35 initiates phase I always in the fast sampling period no. 0 of a slow sampling period. This may for example easily be done in that the cycle is initiated in the control circuit 35 by the next slow clock pulse $I_c'$. It is then also possible to omit the "modulo 32" is formed directly by the output of the address counter 31 to which the adders 41 to 47 are also connected.

The principle described of intermediate storage by means of the buffer store 30 is also not restricted to the case where the discrete values are formed by multiplication of binary sampling values of sign signals and thus consist in each case of only one bit. It is also readily suitable for the case where the sampling circuits 14, 15 are so constructed that they furnish multi-digit binary sampling values representing amount and sign of the sampled signal value. In this case it is only necessary to make the buffer store 30 so that each storage location can accommodate n multi-digit binary code groups in associated sections.

Furthermore, it is not absolutely essential for the capacity of the buffer store 30 to be restricted to k storage locations; it may also be a multiple of k so that in each phase I a multiple of m=n·k discrete values may be intermediately stored and subsequently in phase II each storage location of the summation store 18 correspondingly multiply charged.

The necessary modification of the address computer 38 presents the person skilled in the art with no difficulty.

The circuit components of the correlator of FIG. 5, in particular the buffer store 30, the address counter 31, the control circuit 35, the index counter 37, the address computer 38, the distributor 17 and the summation store 18, may of course also be formed by a suitably programmed microcomputer. The buffer store 30 in this case is preferably an area of the main memory (RAM) of the microcomputer.

The correlation method described above is of course not restricted to the example given of cross correlation of two different signals in correlative velocity measurement. It is basically suitable for all fields of use in which the cross correlation of two different signals is to be carried out or the auto correlation of a signal with itself. In the case of auto correlation, in all the examples of embodiment described above the signal y(t) is simply replaced by the signal x(t).

TABLE I

| sampling time | $t_0$ $t_1$ $t_2$ | $t_{30}$ $t_{31}$ $t_{32}$ $t_{33}$ | $t_{62}$ $t_{63}$ $t_{64}$ $t_{65}$ | $t_{94}$ $t_{95}$ $t_{96}$ $t_{97}$ |
|---|---|---|---|---|
| X register 14 | $X_0$ $X_1$ $X_2$ | $X_{30}$ $X_{31}$ $X_{32}$ $X_{33}$ | $X_{62}$ $X_{63}$ $X_{64}$ $X_{65}$ | $X_{94}$ $X_{95}$ $X_{96}$ $X_{97}$ |
| Y register 15 | | | | |
| stage 15a | $Y_0$ | $Y_{32}$ | $Y_{64}$ | $Y_{96}$ |
| stage 15b | $Y_{-32}$ | $Y_0$ | $Y_{32}$ | $Y_{64}$ |
| stage 15c | $Y_{-64}$ | $Y_{-32}$ | Y | $Y_{32}$ |
| stage 15d | $Y_{-96}$ | $Y_{-64}$ | $Y_{-32}$ | $Y_0$ |
| stage 15e | $Y_{-128}$ | $Y_{-96}$ | $Y_{-64}$ | $Y_{-32}$ |
| stage 15f | $Y_{-160}$ | $Y_{-128}$ | $Y_{-96}$ | $Y_{-64}$ |
| stage 15g | $Y_{-192}$ | $Y_{-160}$ | $Y_{-128}$ | $Y_{-96}$ |
| stage 15h | $Y_{-224}$ | $Y_{-192}$ | $Y_{-160}$ | $Y_{-128}$ |

TABLE II

| | $t_0$ | $t_1$ | $t_2$ | $t_3$ | $t_4$ | $t_{28}$ | $t_{29}$ | $t_{30}$ | $t_{31}$ | $t_{32}$ | $t_{33}$ | |
|---|---|---|---|---|---|---|---|---|---|---|---|---|
| | $X_0$ | $X_1$ | $X_2$ | $X_3$ | $X_4$ | $X_{28}$ | $X_{29}$ | $X_{30}$ | $X_{31}$ | $X_{32}$ | $X_{33}$ | |
| $Y_a$ | 0 | 1 | 2 | 3 | 4 | 28 | 29 | 30 | 31 | 0 | 1 | $\Delta\tau$ |
| $Y_b$ | 32 | 33 | 34 | 35 | 36 | 60 | 61 | 62 | 63 | 32 | 33 | $\Delta\tau$ |
| $Y_c$ | 64 | 65 | 66 | 67 | 68 | 92 | 93 | 94 | 95 | 64 | 65 | $\Delta\tau$ |
| $Y_d$ | 96 | 97 | 98 | 99 | 100 | 124 | 125 | 126 | 127 | 96 | 97 | $\Delta\tau$ |
| $Y_e$ | 128 | 129 | 130 | 131 | 132 | 156 | 157 | 158 | 159 | 128 | 129 | $\Delta\tau$ |
| $Y_f$ | 160 | 161 | 162 | 163 | 164 | 188 | 189 | 190 | 191 | 160 | 161 | $\Delta\tau$ |
| $Y_g$ | 192 | 193 | 194 | 195 | 196 | 220 | 221 | 222 | 223 | 192 | 193 | $\Delta\tau$ |
| $Y_h$ | 224 | 225 | 226 | 227 | 228 | 252 | 253 | 254 | 255 | 224 | 225 | $\Delta\tau$ |

We claim:

1. Method for correlating first and second signals wherein mutually time-displaced sampling values of the two signals are multiplied together and to determine a discrete value of the correlation function the average value of the multiplication results corresponding to the same time displacement is formed, said method comprising: sampling said second signal at a predetermined sampling frequency, sampling said first signal with a sampling frequency which is a multiple of the sampling frequency of said second signal, storing a number of the respective last sampling values of the more slowly sampled signal, multiplying each sampling value of the more rapidly sampled signal simultaneously by all the stored sampling values of the more slowly sampled signal; and separately summing respective multiplication results corresponding to the equal time displacement between the multiplied sampling values.

2. Method according to claim 1, wherein prior to said sampling of said second signal said method includes the step of imparting a predelay to the second signal.

3. Method according to claim 2, wherein said imparting step includes the step of adjusting the predelay.

4. Method according to claim 1 wherein $m = k \cdot n$ discrete values of the correlation function are formed, in said sampling step, the two signals are sampled in the frequency ratio 1:k, and in said storing step the n last sampling values of the more slowly sampled signal are stored.

5. Method according to claim 1, wherein $m = 2^n$ discrete values of the correlation function are formed, in said sampling step, the two signals are sampled in the frequency ratio $1:2^n/n$, where n is a power of 2.

6. Method according to claim 4 or 5, wherein between said multiplying and summing step there is a second storing step, said second storing step including storing, the n multiplication results obtained simultaneously in each sampling period of the first signal in parallel in a buffer store, reading the multiplication results stored in the buffer store from the buffer store and distributing amongst the store locations of the summation store the multiplication results read from said buffer store.

7. Arrangement for correlating first and second signals wherein mutually time displaced sampling values of the signals are multiplied together and discrete values of the correlation function are determined, said arrangement comprising:
means for sampling the two signals in the frequency ratio 1:k;
register means responsive to said sampling means having n stages for storing the n last sampling values of the more slowly sampled signal;
n multiplier circuit means for multiplying two inputs, one input responsive to the content of a corresponding register stage and the other input responsive to the sampling values of the more quickly sampled signal;
a summation store means having $m = k \cdot n$ storage locations; and
distributing circuit means for introducing the multiplication results from the multiplier circuits into the storage locations in said summation store means associated with the respective time displacements with addition to the preceding content.

8. Arrangement according to claim 7, wherein the distributing circuit means and the summation store means are comprised of parts of a microcomputer.

9. Arrangement according to claim 7, wherein said n-stage register means comprises a shift register and further includes means for introducing the sampling values of the more slowly sampled signal into the first register state and for shifting the content of each register stage into the next register stage in time with the lower sampling frequency.

10. Arrangement according to claim 9, wherein said sampling means comprises a plurality of individual sampling means, further including a signal converter preceding each of said individual sampling means for converting the signal to be correlated to a binary signal.

11. Arrangement according to claim 10, wherein each of said individual sampling means comprises a D flip-flop having a D input, a clock input and a Q output, said D input is connected to the output of the corresponding signal converter, and the clock input of said D flip-flop is connected to clock pulses having a recurrence frequency corresponding to the associated sampling frequency.

12. Arrangement according to claim 11, wherein said register means includes a D flip-flop receiving the clock pulses with the lower recurrence frequency as the first stage of an n-stage shift register means, said shift register means comprised of a plurality of subsequent stages formed by D flip-flops each subsequent stage D flip flophaving a D input connected to the Q output of the D flip-flop of the preceding stage said n-stage shift register D flip-flop having clock inputs to which clock pulses with the lower recurrence frequency are applied.

13. Arrangement according to claim 12, wherein each multiplier circuit is comprised of a digital logic circuit.

14. Arrangement according to claim 13, wherein each digital logic circuit comprises an equivalence circuit.

15. Arrangement according to claim 7, wherein said sampling means includes an analog-digital converter means for converting each sampling value to a multi-digit digitally coded signal.

16. Arrangement according to claim 7, the sampling means, the register means and the multiplier circuits are analog circuits and further including an analog-digital converter connected to the output of each multiplier circuit.

17. Arrangement according to claim 7, wherein said second signal is said more slowly sampled signal, further comprising a delay circuit means, responsive to said second signal, for delaying said second signal and for applying said delayed second signal to said sampling means.

18. Arrangement according to claim 17, wherein said delay circuit means has an adjustable delay time.

19. Arrangement according to claim 17, wherein the delay circuit comprises a shift register having a clock input said fast sampling frequency applied to said delay circuit shift register clock input.

20. Arrangement according to claim 19, further including a sampling circuit controlled in time with the fast sampling frequency providing an output to said delay circuit shift register.

21. Arrangement according to claim 7, further comprising:
a clock generator means for furnishing clock pulses having a recurrence frequency corresponding to the fast sampling frequency; and
a frequency divider, responsive to the clock generator and having the division ratio 1:k.

22. Arrangement according to claim 21, wherein said clock generator means comprises an adjustable frequency clock generator.

23. Arrangement according to claim 7, further including:
a buffer store connected between the multiplier circuits and the distributing circuit means; and
a control circuit means for controlling the parallel introduction of the multiplication results into the buffer store in each first phase in time with the fast sampling and for transferring the stored information from the buffer store to the distributing circuit in each second phase at a clock frequency independent of the clock frequency of the fast sampling.

24. Arrangement according to claim 23, wherein said buffer store comprises an integral multiple of k storage locations, each of said storage locations including a capacity adequate to accommodate said multiplier circuit results.

25. Arrangement according to claim 24, wherein said buffer store further includes an address counter means having a count for indicating the address of the storage location, which storage location is affected by the writing in or reading out of a group of multiplication results.

26. Arrangement according to claim 25, wherein the control circuit means includes means for advancing of the address counter with the clock frequency of the fast sampling in each first phase and with the clock frequency of the control circuit transfer in each second phase.

27. Arrangement according to claim 26, further including an address computer means in each second phase, for receiving the signals indicating the count of the address counter and for calculating therefrom the addresses of the storage locations of the summation store means which are associated with the time displacements for which the multiplication results have been obtained which are at the storage location of the buffer store whose address corresponds to the count of the address store.

28. Arrangement according to claim 27, wherein said control circuit means includes means for triggering each first phase simultaneously with the start of a period of the slower sampling.

29. Arrangement according to claim 27, further including index counter means which is continuously advanced in time with the faster sampling and by an index register means, which is triggered by the control circuit means at the start of each first phase, for taking over the instantaneous count of the index counter means, said index register having an output connected to the address computer.

30. Arrangement according to claim 29, wherein said index counter means is a "modulo k" counter.

31. Arrangement according to claim 30, wherein said index counter means includes the frequency divider used for the frequency division 1:k.

32. Arrangement according to claim 23, wherein said control circuit means, the buffer store, and the register means are comprised by components of a microcomputer.

* * * * *